(12) United States Patent
Charlebois et al.

(10) Patent No.: US 8,464,199 B1
(45) Date of Patent: Jun. 11, 2013

(54) CIRCUIT DESIGN USING DESIGN VARIABLE FUNCTION SLOPE SENSITIVITY

(75) Inventors: Margaret R. Charlebois, Jericho, VT (US); Christopher D. Hanudel, Essex Junction, VT (US); Robert D. Herzl, South Burlington, VT (US); David W. Milton, Underhill, VT (US); Clarence R. Ogilvie, Huntington, VT (US); Paul M. Schanely, Essex Junction, VT (US); Tad J. Wilder, South Hero, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/472,814

(22) Filed: May 16, 2012

(51) Int. Cl.
*G06F 17/50* (2006.01)

(52) U.S. Cl.
USPC ............................ 716/132; 716/113; 716/134

(58) Field of Classification Search
USPC .......................................... 716/113, 132, 134
See application file for complete search history.

(56) References Cited

U.S. PATENT DOCUMENTS

| | | | | |
|---|---|---|---|---|
| 5,649,170 A * | 7/1997 | Chappell et al. | ................ | 703/23 |
| 6,297,674 B1 * | 10/2001 | Kono et al. | .................... | 327/108 |
| 6,453,443 B1 * | 9/2002 | Chen et al. | .................... | 716/113 |
| 6,785,870 B2 | 8/2004 | Chen | | |
| 6,869,808 B2 * | 3/2005 | Yonezawa et al. | ............... | 438/14 |
| 6,928,631 B2 * | 8/2005 | Matsumoto | ................... | 716/114 |
| 7,127,384 B2 * | 10/2006 | Zolotov et al. | .................. | 703/14 |
| 7,417,482 B2 | 8/2008 | Elgebaly et al. | | |
| 7,454,731 B2 * | 11/2008 | Oh et al. | ....................... | 716/113 |
| 7,475,366 B2 | 1/2009 | Kuemerle et al. | | |
| 7,551,985 B1 * | 6/2009 | Chen et al. | ..................... | 700/297 |
| 7,576,569 B2 * | 8/2009 | Carpenter et al. | .............. | 327/14 |
| 7,636,864 B2 | 12/2009 | Burton | | |
| 7,714,610 B2 * | 5/2010 | He | .................................. | 326/41 |
| 7,886,246 B2 | 2/2011 | Buck et al. | | |
| 7,890,904 B2 * | 2/2011 | Murgai et al. | .................. | 716/113 |
| 7,921,395 B2 * | 4/2011 | Okumura | ....................... | 716/113 |
| 7,930,674 B2 * | 4/2011 | Parker et al. | ................... | 716/134 |
| 7,934,178 B2 * | 4/2011 | Arimoto | ........................ | 716/100 |
| 8,018,271 B2 | 9/2011 | Shimura | | |
| 8,141,025 B2 | 3/2012 | Sinha et al. | | |
| 8,185,853 B2 * | 5/2012 | Kim et al. | ...................... | 716/107 |
| 8,225,257 B2 * | 7/2012 | Tetelbaum | ..................... | 716/113 |
| 8,255,850 B2 * | 8/2012 | Jain et al. | ....................... | 716/113 |
| 2007/0136705 A1 * | 6/2007 | Hosono | ............................. | 716/6 |
| 2008/0077900 A1 * | 3/2008 | Oh et al. | ......................... | 716/11 |
| 2009/0031155 A1 | 1/2009 | Hofmann et al. | | |
| 2009/0199145 A1 * | 8/2009 | Scheffer | ............................ | 716/6 |
| 2009/0228843 A1 | 9/2009 | Anemikos et al. | | |
| 2010/0037188 A1 | 2/2010 | Jamann et al. | | |
| 2010/0095260 A1 * | 4/2010 | Tetelbaum | ........................ | 716/6 |

(Continued)

Primary Examiner — Naum Levin
(74) Attorney, Agent, or Firm — David J. Zwick; David Cain

(57) ABSTRACT

A method for designing an integrated circuit. A computer determines, for one or more paths in a circuit design, for a value of a design variable at which timing closure of the circuit design is achieved, an approximate slope of a function representing path delay as a function of the design variable. When the computer determines that one of the approximate slopes is not within a defined slope range, the computer determines an adjustment direction and an adjustment value based in part on the magnitude by which the slope is not within the defined slope range. The computer changes the circuit design of the path associated with the out-of-range slope, based in part on the adjustment direction and the adjustment value, so as to bring the slope within the defined slope range.

12 Claims, 5 Drawing Sheets

U.S. PATENT DOCUMENTS

2010/0281448 A1* 11/2010 He .................................. 716/6
2010/0333057 A1   12/2010 Tang et al.
2011/0080202 A1   4/2011 Moore et al.
2011/0138347 A1* 6/2011 Tetelbaum ................... 716/133

* cited by examiner

CIRCUIT DESIGN USING DESIGN VARIABLE FUNCTION SLOPE SENSITIVITY

FIELD OF THE INVENTION

The present invention relates generally to integrated circuit design, and more particularly to integrated circuit design based in part on the sensitivity of path delay to changes in a design variable.

BACKGROUND

In integrated circuit design methodology, timing closure is a process that involves analyzing each path in the circuit to determine whether it meets the clock cycle time requirements of the design. A "path" in a circuit design refers to an electrical signal path (i.e., the series of interconnects and devices) between two nodes in the design. A "critical path" is the path between two nodes in a design having the maximum delay. If a path does not meet the clock cycle time requirements, the operational speed of one or more components on the path can typically be improved. The operational speed of a path component can be improved in many ways. A typical approach for improving the speed of a path component involves replacing a higher threshold voltage implementation of the path component with a lower threshold voltage implementation of the component, which operates faster. However, each design change has trade-offs in terms of various circuit operation parameters. For example, a higher threshold voltage implementation of the path component can be replaced with a lower threshold voltage implementation of the component, but lower threshold voltage implementations leak more power than the higher threshold voltage implementations. As a result, such a replacement generally will increase the power requirements in the circuit. After design changes are made to the circuit, all paths are again analyzed to determine whether they meet the clock cycle time requirements of the design.

Timing of integrated circuits may vary due to the effects of environmental and process variation. Example sources of variation include: voltage, metal thickness, temperature, transistor channel length, transistor threshold voltage, gate oxide thickness and other process controlled performance changing parameters. Timing analyses are typically performed based on a discrete set of defined parameters relating to the environmental and process parameters. For example, a timing analysis can be performed based on a set of parameters that define nominal values of these parameters. Other analyses can be performed based on best case and worst case values of the design parameters to ensure that timing is met for the full range of expected operating and process conditions. A defined set of environmental and process parameters against which a timing analysis is run is called a "corner."

Energy consumption of an integrated circuit is exponentially related to the supply voltage of the chip. Reducing the supply voltage of the circuit is the most effective way to reduce its energy consumption. Voltage scaling is a technique by which supply voltage is reduced based on various factors, such as peak computing requirements versus average computing requirements. High performance is typically needed only a small fraction of the time, while for the rest of the time, a low-performance, low-power processor would suffice. Low performance can be achieved by lowering the supply voltage of the integrated circuit, which in turn will reduce the operating frequency of the processor when the high performance is not needed.

Adaptive voltage scaling (AVS) is a power management technique in which the supply voltage of an integrated circuit is adjusted automatically. The supply voltage is adjusted using closed loop feedback to a minimum level that is required for the proper operation of the integrated circuit at a given clock frequency. AVS uses a closed loop approach to regulate processor performance by automatically adjusting the power supply voltage of the integrated circuit power supply to compensate for process and temperature variation in the processor. Thus, the supply voltage in the AVS system is automatically reduced at lower temperatures or other conditions where the integrated circuit does not need as much performance, and for chips that come out the manufacturing process with a faster speed. As the supply voltage is reduced, the power consumption is also reduced. It would be advantageous for an AVS system to work effectively if timing closure is achieved over a sufficiently wide voltage range, and circuit performance sensitivity to voltage was made consistent across all critical paths on the chip.

SUMMARY

Embodiments of the present invention provide a system, method, and program product for designing an integrated circuit. A computer determines, for one or more paths in a circuit design, for a value of a design variable at which timing closure of the circuit design is achieved, the approximate slope of a function representing path delay as a function of the design variable. The design variable can be, for example, voltage, temperature, power-on hours, age of circuit, clock frequency, and NP skew.

When the computer determines that one of the approximate slopes is not within a defined slope range, the computer determines an adjustment direction and an adjustment value based in part on the magnitude by which the slope is not within the defined slope range. The defined slope range can be based on, for example, the mean value of the approximate slopes of all of the one or more paths, a fixed value based on the technology of the integrated circuit, and the slope of a path having the largest magnitude by which it is not within the first acceptable slope range.

The computer changes the circuit design of the path associated with the out-of-range slope, based in part on the adjustment direction and the adjustment value, thereby bringing the one approximate slope within the defined slope range. The design changes to the circuit include, for example, changing the resistive-capacitive (RC) wire delay of the path, changing fan-out of the path, changing the number of repeaters on the path, and changing the power code of the circuit.

In certain embodiments, adjustment value defines an adjustment to path slack, such that when the adjustment to path slack is combined with the slack of the path associated with the out-of-range slope, the associated path does not meet timing closure. Changes to the circuit design affect the path slack of the associated path to cause the associated path to meet timing closure, such that the design changes to affect the path slack of the associated path also cause the out-of-range slope to be within the defined slope range.

DETAILED DESCRIPTION

The present invention and various features, aspects, and details are explained more fully with reference to the non-limiting embodiments that are illustrated in the accompanying drawings and detailed in the following description.

As mentioned above, it would be advantageous for an AVS system to work effectively if timing closure is achieved over a sufficiently wide voltage range, and circuit performance sensitivity to voltage is made consistent across all critical paths on the chip. Embodiments of the present invention are disclosed in which a metric that takes into account the slope of a function representing performance sensitivity to voltage is introduced into the integrated circuit design methodology. The metric is used to identify paths that will limit chip performance with respect to changes in voltage. These paths will usually be those paths having the largest deviation from a target slope. Design changes are made to the identified paths which will adjust the chip's response to voltage and improve the benefits of AVS by forcing this metric to be consistent across all critical paths on the chip.

Figure 1:
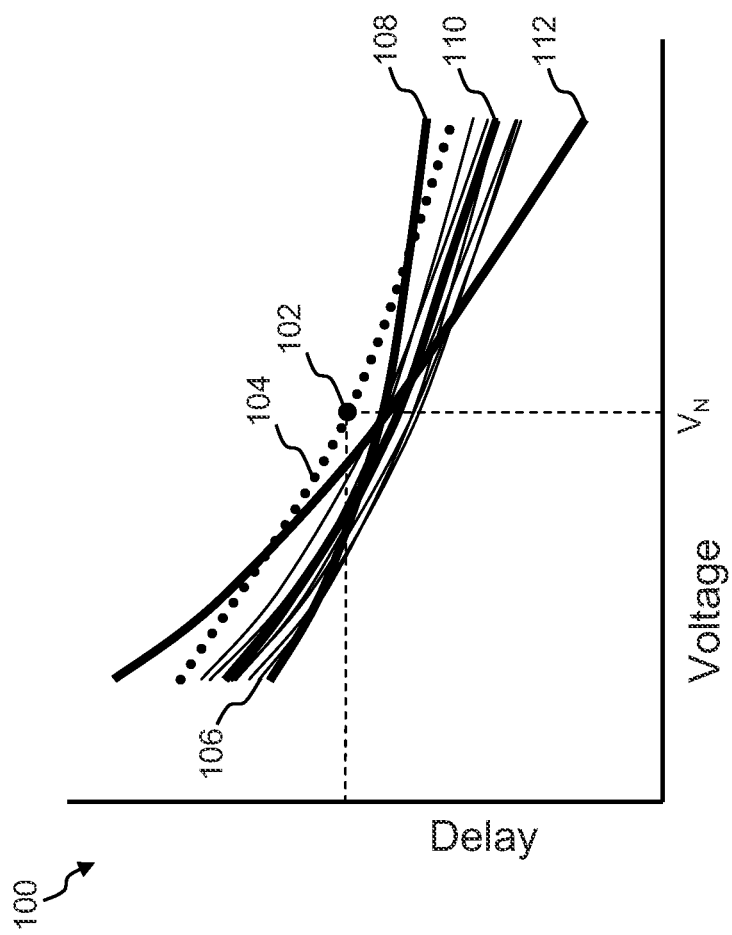
FIG. 1 is a graph illustrating delay as a function of voltage at a particular timing closure point for a set of critical paths in an integrated circuit design in accordance with an embodiment of the present invention.

FIG. 1 shows a graph illustrating delay as a function of voltage at a particular timing closure point for a set of critical paths in an integrated circuit design in accordance with an embodiment of the present invention. Delay function graph 100 shows timing closure point 102, timing closure function line 104, delay function lines 106, delay function line A 108, delay function line B 112, and target delay function line 110. Delay function lines 106 can refer generally to all the delay function lines illustrated on delay function graph 100, or to a single delay function line 106 depending on context, although it is shown in FIG. 1 as indicating only a single general delay function line.

Timing closure point 102 represents the maximum delay that can be tolerated for any path on the chip at a particular corner having supply voltage $V_N$. As illustrated, the difference in delay values between the delay for timing closure point 102 and the delay for any of the delay function lines 106 is referred to as slack, i.e., the safety margin with respect to delay.

A single delay function line 106 represents the calculated delay that will be seen for a specific critical path in an integrated circuit design as a function of supply voltage to the integrated circuit. Each delay function line 106 represents an extrapolation or interpolation of delay as a function of voltage based on calculating the delay at two or more voltage levels. For example, path delay can be calculated at $V_N$, and at another supply voltage value of $V_N$ plus 20 mV. The slope $M_V$ of a delay function line 106 is calculated by the following equation:

$$M_V = \frac{\Delta \text{Delay}}{\Delta \text{Voltage}} \quad (1)$$

where ΔDelay is the difference in delay as determined at two chip operating voltages, for example, the delay at $V_N$ plus 20 mV minus the delay at $V_N$, and ΔVoltage is the difference in the measurement voltages, for example, 20 mV. The shape or profile of delay function lines 106 can be based on an actual or theoretical model of delay as a function of voltage over the relevant voltage range. For example, as illustrated in FIG. 1, the shape of delay function lines 106 over the range illustrated is based on a model that predicts that delay as a function of voltage exhibits generally a slight concavity towards the x-axis, and at lower voltages, and delay is more sensitive to lower voltages, as illustrated by each delay function line 106 bending towards higher delays at lower voltage values.

In a preferred embodiment, target delay function line 110 represents the estimated average slope of all delay function lines 106. This is determined as the arithmetic mean of the slopes of all delay function lines 106 at $V_N$, with the shape of target delay function line 110 based the model. Delay function line A 108 and delay function line B 112 represent the delay function lines 106 having the smallest (shallowest) and largest (steepest) magnitude slopes, respectively. In terms of chip performance, the paths associated with these particular delay function lines 108 and 110 can dominate, depending on whether the supply voltage is greater than or less than $V_N$. For example, for a desired increase in delay from the delay at $V_N$, the path associated with delay function line B 112 would dominate chip performance. Because delay function line B 112 has a steep slope, the decrease in voltage required to achieve the desired delay in the critical path associated with delay function line B 112 is less than for the other delay function lines 106. Because the voltage decrease necessary to achieve the desired delay is less than for all other delay function lines 106, the decrease in energy consumption will also be less. Similarly, for a desired decrease in delay from the delay at $V_N$, the path associated with delay function line A 108 would dominate chip performance. Because delay function line A 108 has a shallow slope, the increase in voltage required to achieve the desired delay in the critical path associated with delay function line A 108 is greater than for the other delay function lines 106. Because the voltage increase necessary to achieve the desired delay is greater than for all other delay function lines 106, the increase in energy consumption will also be greater.

Another aspect of paths having delay functions with much greater or lesser slopes than the other paths on a chip is that these paths may violate timing requirements at lesser deviations from the nominal voltage $V_N$ than other paths on the chip. Timing closure function line 104 represents estimated timing closure points as a function of voltage, all other corner parameters remaining approximately the same, if all paths on the chip had delay functions represented by target delay function line 110. As can be seen, a sufficient voltage deviation from $V_N$ towards lower voltages will result in delay function line B 112 violating timing. Similarly, a sufficient voltage deviation from $V_N$ towards higher voltages will result in delay function line A 108 violating timing.

Figure 2:
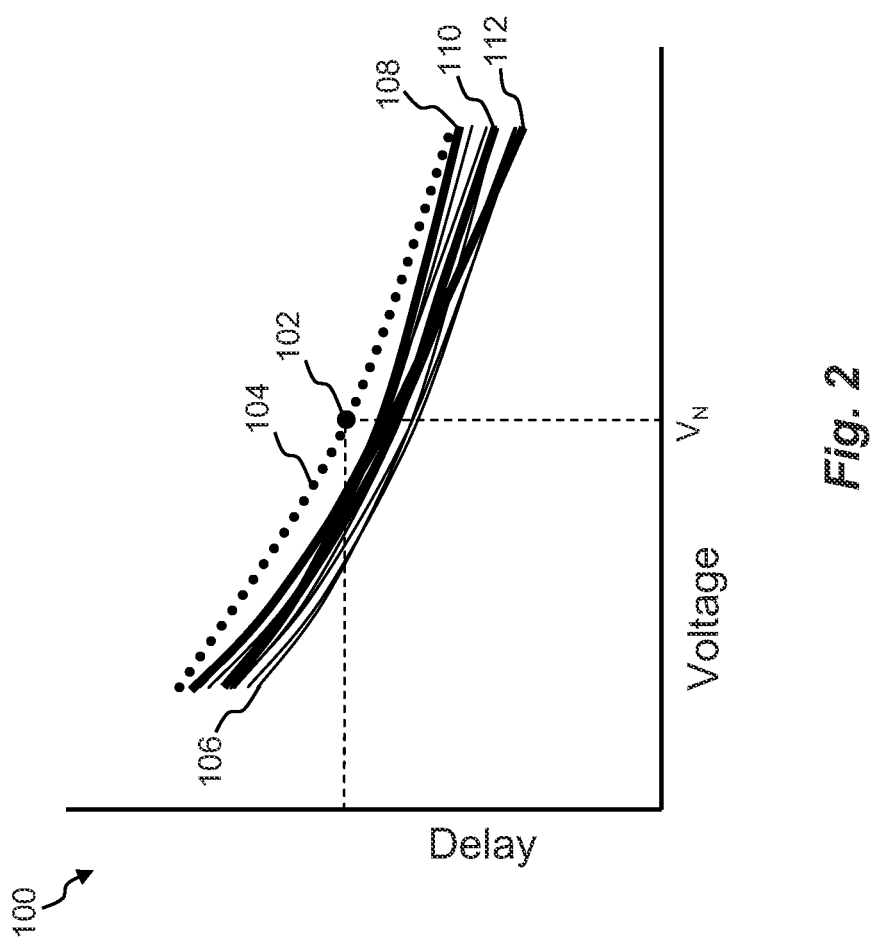
FIG. 2 is the graph of FIG. 1, illustrating that the slopes of two particular delay versus voltage functions have been adjusted to bring their slopes closer to a target slope for the set of critical paths in the integrated chip in accordance with an embodiment of the present invention.

In embodiments, of the invention, design changes are made to paths with much greater or lesser sensitivity to voltage than the other paths on a chip to bring the sensitivity closer to the desired target sensitivity. FIG. 2 illustrates the result of these design changes. As illustrated, the slope of delay function line A 108 has been increased and the slope of delay function line B 112 has been decreased to bring these slopes closer to the slope of target delay function line 110. As is shown, the range of voltage deviation about $V_N$ without a delay function line 106 intersecting timing closure function line 104 has been increased. In other words, the delay sensitivities to voltage of the most sensitive paths on the chip have been made consistent with the other circuit paths such that these paths will meet timing closure over a broader range of supply voltage, and greater increases and decreases in chip delay may be achieved at a greater energy savings.

Figure 3:
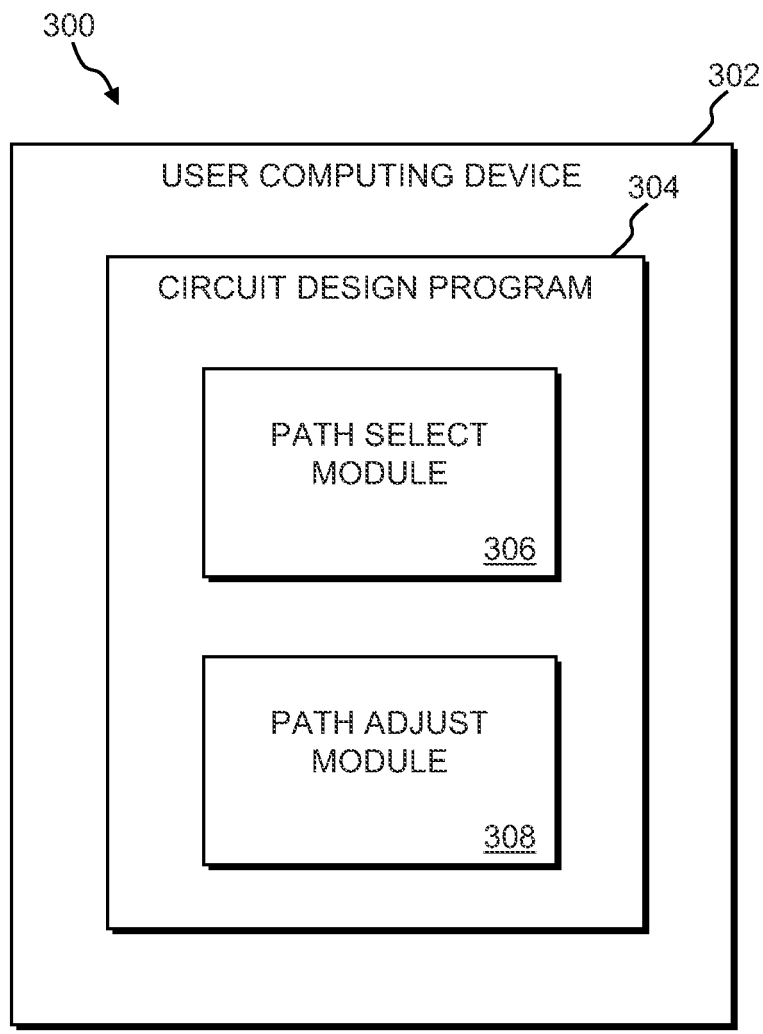
FIG. 3 is a functional block diagram of a path sensitivity adjustment system in accordance with an embodiment of the present invention.

FIG. 3 is a functional block diagram of a path sensitivity adjustment system 300 in accordance with an embodiment of the present invention. Path sensitivity adjustment system 300 includes circuit design program 304, which executes on user computing device 302. In preferred embodiments of the invention, user computing device 302 can be a mainframe or mini computer, a laptop, tablet, or netbook personal computer (PC), or a desktop computer. In general, computing device 302 can be any programmable electronic device that will support circuit design program 304 in accordance with embodiments of the present invention, and as described in more detail with respect to FIG. 5.

Circuit design program 304 includes path select module 306 and path adjust module 308. In a preferred embodiment, circuit design program 304 can be any commercially available or open source circuit design system that directly supports, or will support user enhancements capable of implementing the functionality of, path select module 306 and path adjust module 308 in accordance with embodiments of the present invention.

Figure 4:
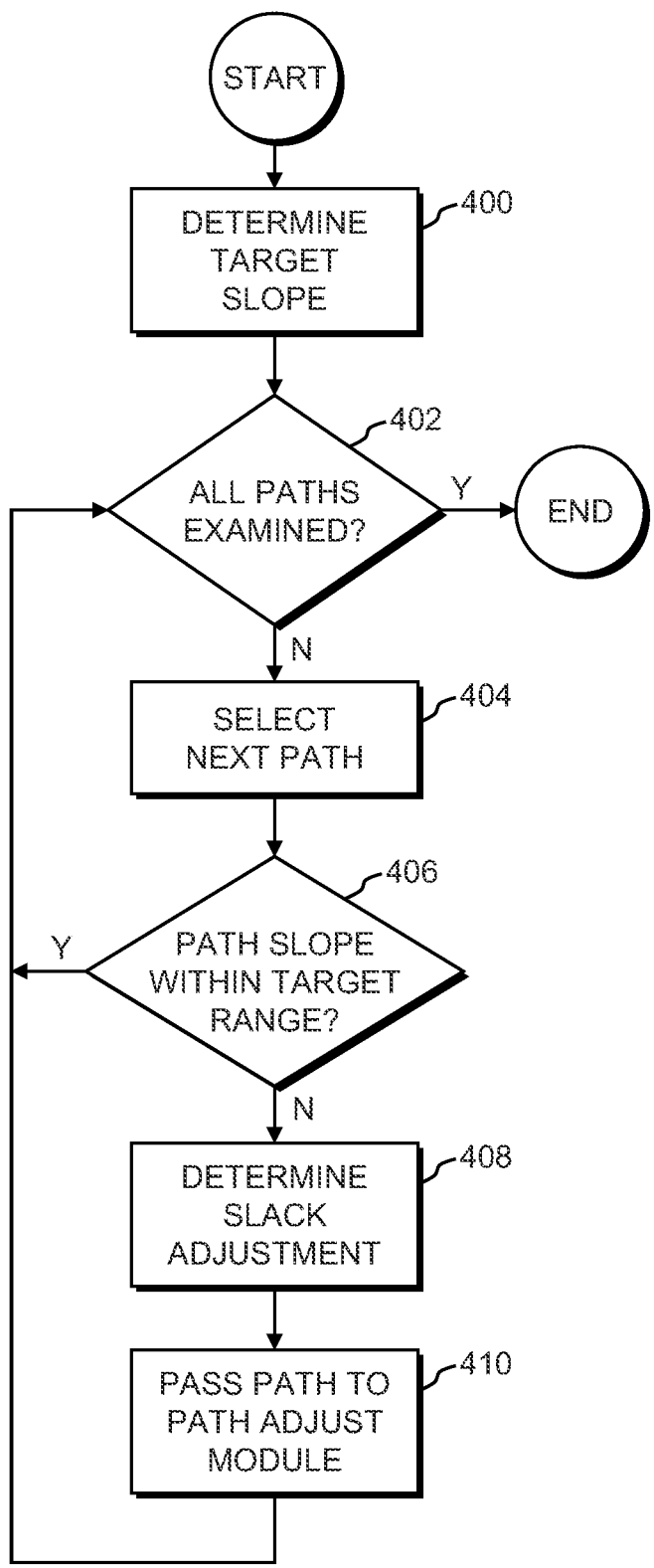
FIG. 4 is a flowchart showing the operation of the path select module of FIG. 3.

Path select module 306, the operation of which is described in more detail with respect to FIG. 4, determines a target slope for delay as a function of voltage, and determines if the slope for each critical path in the circuit design is within a defined range about the target slope. In preferred embodiments of the invention, the capabilities of path select module 306 are implemented as user added functionality to circuit design program 304. In preferred embodiments, the slope of the delay function for each critical path is calculated by circuit design program 304 and is made available to path select module 306. For example, as circuit design program 304 determines if timing closure is met for all paths, information identifying the path, along with information associated with slope for delay as a function of voltage for the path, can be stored in a data structure which is made available to path select module 306. In a preferred embodiment, if the slope of a path is not within the defined range, information identifying the path, information indicating whether a positive or negative slope adjustment should be made, and information indicating the magnitude of the desired slope adjustment, is passed to path adjust module 308. Path select module 306 then continues processing on the next critical path.

Path adjust module 308 operates to perform circuit design changes to the paths identified by path select module 306 as having target slopes for delay as a function of voltage that are not within the defined range about the target slope. Techniques to adjust a path's delay sensitivity to voltage are known in the art, and include adding or removing RC wire delay from the path, such as changing wire types or levels and shielding or isolating wires to add RC delay; power code changes, such as changing the size of the N and P FETs; changing the topology of the distribution network, such as changing fan-out and changing the number of repeaters per unit length in a long path; and changing the Vt types of the books in the path. Depending on the situation in which these techniques are used and in what combinations, the delay sensitivity function slope can be adjusted either positively or negatively. These same techniques are also used to adjust the slack in a circuit path. After circuit design changes have been performed for all identified paths, all paths are again examined to determine if the slopes for delay as a function of voltage are within the defined range about the target slope.

Although path select module 306 and path adjust module 308 are shown as discrete modules for exemplary purposes, in other embodiments, the functionality of these modules can be fully integrated into circuit design program 304, or their functionality can be distributed in a different manner than is described.

FIG. 4 is a flowchart showing the operation of the path select module 306 of FIG. 3. Path select module 306 first determines the desired target slope for delay as a function of voltage for all critical paths on the chip (step 400). The target slope can be determined in several ways. In a preferred embodiment, the target slope is calculated as the arithmetic average of the slopes of all delays as functions of voltage for all critical paths on the chip. Alternatively, several additional non-exclusive examples are as follows. The average can also be a weighted average based on, for example, the paths that will be exercised the most during normal operation. The target slope can also be a fixed value for a technology, with an associated standard deviation. The target slope can also be based on the dominant critical paths, i.e., those paths having the largest and smallest slopes. For example, the target slope could be the average of the slopes of the dominant critical paths, and the standard deviation based on the slopes of all delays as functions of voltage for all critical paths on the chip. Depending on the circuit design and technology and other factors, one method may be more appropriate for a given design.

Path select module 306 then begins processing the critical paths in the circuit design. Path select module 306 first determines if all critical paths have been examined (decision step 402). If all paths have been examined, then path select module 306 ends processing (decision step 402, "yes" branch). If all paths have not been examined, then information associated for the next path to examine is identified (step 404).

When information for the next path to process has been identified, in particular, the slope for delay as a function of voltage for the path, path select module 306 determines if the slope is within a defined target range. In a preferred embodiment, path select module 306 determines if the following equation is true:

$$\mu - A\sigma \leq M_V \leq \mu + B\sigma \qquad (2)$$

where: $M_V$ is the slope for delay as a function of voltage for the current path being processed, as defined above in equation (1); $\mu$ is the arithmetic mean of all slope values for delay as a function of voltage for all critical paths on the chip, visually illustrated as target delay function line 110; $\sigma$ is the standard deviation for all slope values for delay as a function of voltage for all critical paths on the chip; and A and B are constants that are specified by users of circuit design program 304. In essence, equation (2) defines the target range as $\mu - A\sigma : \mu + B\sigma$. Constants A and B can be equal, thus defining a symmetric range about $\mu$, or they can have different values, thus defining an asymmetric range about $\mu$. An asymmetric range about $\mu$ may be preferable if the shape of delay function lines 106 is asymmetric about timing closure point 102.

If the slope for delay as a function of voltage for the path being processed is within the defined target range, as defined by equation (2) (decision step 406, "yes" branch), then path select module 306 determines if all paths have been examined (decision step 402), and either selects the next path for processing (step 404), or ends processing (decision step 402, "yes" branch).

If the slope for delay as a function of voltage for the path being processed is not within the defined target range, as defined by equation (2) (decision step 406, "no" branch), then path select module 306 determines the amount by which the slope for delay as a function of voltage for the path should be adjusted, and whether the adjustment is positive or negative (step 408).

In a preferred embodiment, adjustments made by path adjust module 308 are not made directly to the slope of a path, but rather to the slack of the path. However, because the techniques used to adjust slack are the same as those that affect the delay sensitivity as a function of voltage, the effect can be the same. In the preferred embodiment, path adjust module 308 determines a slack adjustment (as described below) that when added to the slack for the out-of-range path will result in a negative slack for the path. The adjusted (negative) slack, along with an indication of whether the slope needs to be adjusted positively or negatively, is passed to path adjust module 308 (step 410). Based on the magnitude of the negative slack, and the indication of whether the slope should be adjusted positively or negatively, path adjust module 308 performs one or more of the techniques to adjust the delay sensitivity function slope described above. In this manner, a path that otherwise would meet timing, but whose sensitivity function slope is not within the desired range, is flagged as not meeting timing. Adjustments are made to the path, ostensibly to adjust slack, but that will also affect the slope of the delay sensitivity function in the desired direction.

In a preferred embodiment, the amount by which the slack should be adjusted is determined by the following equation:

$$S_A = D \left( \frac{|M_v - \mu|}{\sigma} \right)^C \quad (3)$$

where $S_A$ is the slack adjustment amount, $M_V$ is the slope for delay as a function of voltage for the path being processed, $\mu$ is the arithmetic mean of all slope values for delay as a function of voltage for all critical paths on the chip (or an alternative value), $\sigma$ is the standard deviation for all slope values for delay as a function of voltage for all critical paths on the chip (or an alternative value), and D and C are constants that are specified by users of circuit design program 304. In essence, $S_A$ is based on how far away $M_V$ is from the mean slope value as a fraction of the standard deviation for all slope values for delay as a function of voltage for all paths on the chip (or an alternative standard deviation value). Constants D and C can be used to "fine tune" the profile of $M_A$, based on such factors as chip technology, difficulty in performing delay adjustments to critical paths, cross-path impacts for delay adjustments, etc.

After path select module 306 has determined a slack adjustment value (step 408), this information, along with an indication of whether the slope is to be adjusted positively or negatively, is passed to path adjust module 308 (step 410) to perform design changes in the circuit design to bring delay sensitivity to voltage for the path more in line with the target value. Path select module 306 then determines if all paths have been examined (decision step 402), and either selects the next path for processing (step 404), or ends processing (decision step 402, "yes" branch).

In an alternative embodiments, path adjust module 308 is configured to make design changes to directly address desired changes to delay sensitivity function slope. In these embodiments, for example, equation (3) calculates a desired change to slope rather than to slack. This can be accomplished, for example, by giving the constants C and D values appropriate to slope adjustment.

Figure 5:
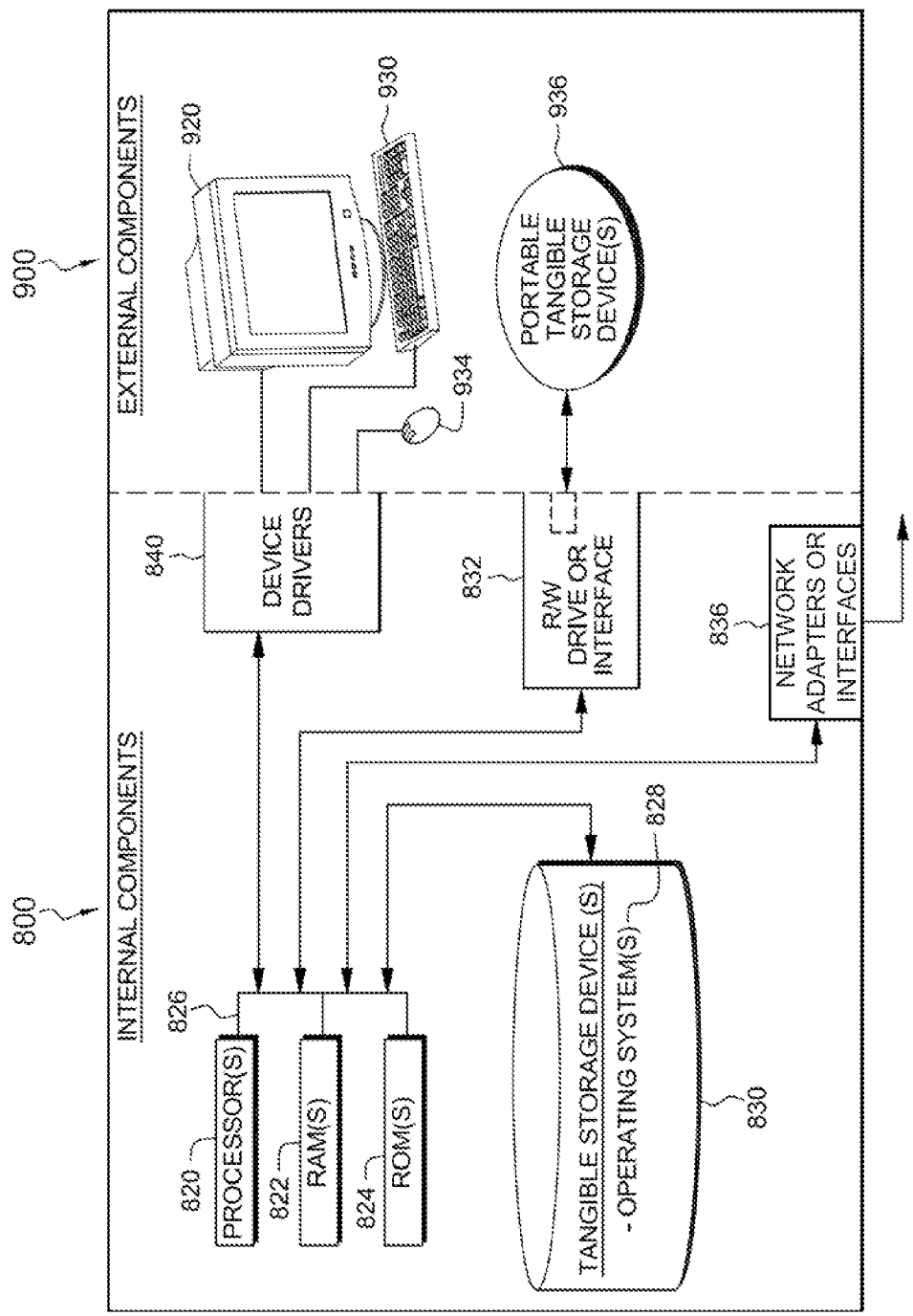
FIG. 5 is a block diagram of hardware and software within the user computing device of FIG. 1.

FIG. 5 shows a block diagram of the components of a data processing system 800, 900, such as computing device 302, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, mainframe computer systems, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computing device 302 includes internal components 800 and external components 900 as illustrated in FIG. 5. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 304, 306, and 308 in computing device 302 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 304, 306, and 308 in computing device 302 can be stored on one or more of the respective portable computer-readable tangible storage devices 936, read via the respective R/W drive or interface 832 and loaded into the respective hard drive 830.

Internal components 800 also includes network adapters or interfaces 836 such as a TCP/IP adapter cards, wireless wi-fi interface cards, or 3G or 4G wireless interface cards or other wired or wireless communication links. The programs 304, 306, and 308 in computing device 302 can be downloaded to computing device 302 from an external computer via a network (for example, the Internet, a local area network or other, wide area network) and network adapters or interfaces 836. From the network adapters or interfaces 836, the programs 304, 306, and 308 in computing device 302 are loaded into hard drive 830. The network may comprise copper wires, optical fibers, wireless transmission, routers, firewalls, switches, gateway computers and/or edge servers.

External components 900 can include a computer display monitor 920, a keyboard 930, and a computer mouse 934.

External components 900 can also include touch screens, virtual keyboards, touch pads, pointing devices, and other human interface devices. Internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java®, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for designing an integrated circuit, the method comprising the steps of:
 a computer determining, for one or more paths in a circuit design, for a value of a design variable at which timing closure of the circuit design is achieved, an approximate slope of a function representing path delay as a function of the design variable;
 the computer determining that one of the one or more approximate slopes is not within a defined slope range;
 the computer determining a slope adjustment direction and a path slack adjustment value based in part on the magnitude by which the one approximate slope is not within the defined slope range, such that when the path slack adjustment value is applied to the slack of the path associated with the one approximate slope, the associated path does not meet timing closure; and
 the computer changing the circuit design of the path associated with the one approximate slope, based in part on the adjustment direction and the slack of the path associated with the one approximate slope with the path slack adjustment value applied, to affect the adjusted path slack of the associated path to cause the associated path to meet timing closure, whereby the design changes to affect the adjusted path slack of the associated path cause the one approximate slope to be within the defined slope range.

2. A method according to claim 1, wherein the design variable includes one or more of: voltage, temperature, power-on hours, age of circuit, clock frequency, and NP skew.

3. A method according to claim 1, wherein the defined slope range is based on one or more of: the mean value of the approximate slopes of all of the one or more paths, a fixed value based on the technology of the integrated circuit, and the slope of a path having the largest magnitude by which it is not within the first acceptable slope range.

4. A method according to claim 1, wherein the design changes to the circuit include one or more of: changing the RC wire delay of the path, changing fan-out of the path, changing the number of repeaters on the path, and changing the power code of the circuit.

5. A computer program product for designing an integrated circuit, the computer program product comprising:
 one or more computer-readable tangible storage devices and program instructions stored on at least one of the one or more storage devices, the program instructions comprising:
 program instructions to determine, for one or more paths in a circuit design, for a value of a design variable at which timing closure of the circuit design is achieved, an approximate slope of a function representing path delay as a function of the design variable;
 program instructions to determine that one of the one or more approximate slopes is not within a defined slope range;
 program instructions to determine a slope adjustment direction and a path slack adjustment value based in part on the magnitude by which the one approximate slope is not within the defined slope range, such that when the path slack adjustment value is applied to the slack of the path associated with the one approximate slope, the associated path does not meet timing closure; and
 program instructions to change the circuit design of the path associated with the one approximate slope, based in part on the adjustment direction and the slack of the path associated with the one approximate slope with the path slack adjustment value applied, to affect the adjusted path slack of the associated path to cause the associated path to meet timing closure, whereby the design changes to affect the adjusted path slack of the associated path cause the one approximate slope to be within the defined slope range.

6. A computer program product according to claim 5, wherein the design variable includes one or more of: voltage, temperature, power-on hours, age of circuit, clock frequency, and NP skew.

7. A computer program product according to claim 5, wherein the defined slope range is based on one or more of: the mean value of the approximate slopes of all of the one or more paths, a fixed value based on the technology of the integrated circuit, and the slope of a path having the largest magnitude by which it is not within the first acceptable slope range.

8. A computer program product according to claim 5, wherein the design changes to the circuit include one or more of: changing the RC wire delay of the path, changing fan-out of the path, changing the number of repeaters on the path, and changing the power code of the circuit.

9. A computer system for designing an integrated circuit, the computer system comprising:
- one or more processors, one or more computer-readable memories, one or more computer-readable tangible storage devices, and program instructions stored on at least one of the one or more storage devices for execution by at least one of the one or more processors via at least one of the one or more memories, the program instructions comprising:
- program instructions to determine, for one or more paths in a circuit design, for a value of a design variable at which timing closure of the circuit design is achieved, an approximate slope of a function representing path delay as a function of the design variable;
- program instructions to determine that one of the one or more approximate slopes is not within a defined slope range;
- program instructions to determine a slope adjustment direction and a path slack adjustment value based in part on the magnitude by which the one approximate slope is not within the defined slope range, such that when the path slack adjustment value is applied to the slack of the path associated with the one approximate slope, the associated path does not meet timing closure; and
- program instructions to change the circuit design of the path associated with the one approximate slope, based in part on the adjustment direction and the slack of the path associated with the one approximate slope with the path slack adjustment value applied, to affect the adjusted path slack of the associated path to cause the associated path to meet timing closure, whereby the design changes to affect the adjusted path slack of the associated path cause the one approximate slope to be within the defined slope range.

10. A computer system according to claim 9, wherein the design variable includes one or more of: voltage, temperature, power-on hours, age of circuit, clock frequency, and NP skew.

11. A computer system according to claim 9, wherein the defined slope range is based on one or more of: the mean value of the approximate slopes of all of the one or more paths, a fixed value based on the technology of the integrated circuit, and the slope of a path having the largest magnitude by which it is not within the first acceptable slope range.

12. A computer system according to claim 9, wherein the design changes to the circuit include one or more of: changing the RC wire delay of the path, changing fan-out of the path, changing the number of repeaters on the path, and changing the power code of the circuit.

* * * * *